United States Patent [19]

Saito et al.

[11] 4,416,847

[45] Nov. 22, 1983

[54] METHOD AND APPARATUS FOR DETECTING FAILURE OF NUCLEAR FUEL

[75] Inventors: Shozo Saito; Takeshi Suzumura, both of Hitachi, Japan

[73] Assignee: Hitachi, Ltd., Tokyo, Japan

[21] Appl. No.: 178,596

[22] Filed: Aug. 15, 1980

[30] Foreign Application Priority Data

Aug. 20, 1979 [JP] Japan .............................. 54-105041

[51] Int. Cl.³ .............................................. G21C 7/00
[52] U.S. Cl. ................................................... 376/253
[58] Field of Search ............................. 376/253; 3/14

[56] References Cited

U.S. PATENT DOCUMENTS

| | | | |
|---|---|---|---|
| 3,762,993 | 10/1973 | Jones | 376/253 |
| 3,775,245 | 11/1973 | Delishe et al. | 376/253 |
| 3,801,440 | 4/1974 | Apt, Jr. et al. | 376/253 |
| 3,801,441 | 4/1974 | Jones | 376/253 |
| 3,806,409 | 4/1974 | Debergh et al. | 376/253 |
| 4,072,559 | 2/1978 | Neidl et al. | 376/253 |
| 4,147,587 | 4/1979 | Utamura et al. | 376/253 |
| 4,248,666 | 2/1981 | Olsson | 376/253 |

*Primary Examiner*—Sal Cangialosi
*Attorney, Agent, or Firm*—Antonelli, Terry & Wands

[57] ABSTRACT

A method and an apparatus for detecting failure of nuclear fuel by means of a multi-handle automatic sipper, which comprises a shipper capping operation of mounting a sipper cap of the apparatus for detecting failure of nuclear fuel on the top part of fuel assemblies, an isolation operation of supplying air into the cap after completion of sipper capping operation, thereby forming an air layer, and isolating the fuel assemblies to be detected from other fuel assemblies, a soaking operation of keeping the fuel assemblies in the isolated state for a predetermined period of time, a cell water removal operation of discharging water from system, and a sampling operation of introducing a predetermined amount of cooling water in the fuel assemblies to a sample water receptacle, the operations being provided in sequence, and other operations being carried out in parallel with the aforementioned operations.

14 Claims, 12 Drawing Figures

METHOD AND APPARATUS FOR DETECTING FAILURE OF NUCLEAR FUEL

BACKGROUND OF THE INVENTION

The present invention relates to a method and an apparatus for detecting failure of nuclear fuel, and particularly to a method and an apparatus for detecting failure of nuclear fuel for a shorter time.

A large number of fuel assemblies are disposed in a rector core of a boiling water type nuclear reactor. When fuel rods constituting fuel assemblies are damaged, a radioactive material flows out of the fuel rods and contaminates the cooling water passing through the reactor core. When a nuclear reactor is operated in such a state as a large number of fuel rods remain in failure, a nuclear reactor pressure vessel surrounding the reactor, structures within the pressure vessel, and apparatuses and pipings of nuclear reactor plant such as a cooling water purification apparatus, a steam turbine, etc. are contaminated by the radioactive material of a high radioactivity level, and their maintenance and inspection are difficult to conduct. Furthermore, there is a risk of increasing the radioactive material that will be discharged into the surrounding atmosphere through an off-gas system connected to a condenser. To avoid such a risk, the state of failure of fuel assemblies charged in the reactor core is periodically inspected, and as soon as a failure of nuclear fuel assembly is found, it is replaced with a new fuel assembly.

The conventional method for detecting a failure of fuel assembly is disclosed in U.S. Pat. No. 4,147,587. The outline of the method is given below:

After a boiling water type nuclear reactor is shut down, the top cover of a nuclear reactor pressure vessel is removed, and cooling water is filled therein up near to the topmost floor of nuclear reactor housing. A sipper cap of an apparatus for detecting failure of nuclear fuel is fixed to the top part of fuel assemblies charged in the reactor core. In parallel with the sipper capping operation, a flushing operation is carried out for a sampling line fixed to the shipper cap for sampling the cooling water in the fuel assemblies (sampling line flushing operation). Flushing-out of radioactive material, etc. deposited in the sampling line during the preceding sampling operation is carried out by sampling line flushing operation. After the end of sipper capping operation, air is supplied into the sipper cap to form an air layer, and a fuel assemblies to be inspected are isolated from other fuel assemblies (isolation operation). The flow of cooling water passing through the fuel assemblies is stopped by an isolation operation. The isolation operation is continued until a sampling operation, which will be described later, has been completed. After discharging air bubbles at a recess part at the lower end of the sipper cap is confirmed, the fuel assemblies are kept in that state for a predetermined period of time (soaking operation). The air is supplied into the sipper cap during the isolation operation. During the soaking operation, the temperature of cooling water in the fuel assemblies is increased by the heat of decay of nuclear fuel. If there is failure of fuel rod in a fuel assembly, the radioactive material is discharged from the part in failure of the fuel rod, and the radioactivity level of the cooling water in the fuel assembly is increased. During the soaking operation, a sampling pump flushing operation is completed. The sampling pump flushing operation is a flushing operation for the downstream side of sampling line including a sampling pump, which has not been subjected to the sampling line flushing operation. As soon as the soaking operation is completed, the sampling pump is driven to discharge te flushing water (cell water) retained in the sampling line therefrom at a discharge outlet (cell water removal operation). At that time, a portion of the cooling water in the fuel assemblies is led by suction into the sampling line projected into the fuel assemblies through the sipper cap at the suction inlet. When the removal of cell water is completed, the driving of the sampling pump is stopped, and a sample water receptacle is set to the discharge outlet of the sampling line (sample water receptacle-setting operation). Then, the sampling pump is driven for a predetermined period of time, and the cooling water in the fuel assemblies is sampled. A predetermined amount of the sampled cooling water is led into the sample water receptacle from the sampling line at the discharge outlet (samping operation). The radioactivity level of the cooling water in the sample water receptacle is measured, and the presence of failure of the fuel assemblies is determined by the measured radioactivity level. When the sampling operation is completed, a sipper cap is fixed to other fuel assemblies, and the aforementioned operations are successively repeated.

In the foregoing conventional method for detecting failure of nuclear fuel, operating personnel must set the sample water receptacle to the discharge outlet of the sampling line. The setting of the sample water receptacle is carried out after the discharge of the cooling water at the discharge outlet has been completely stopped to prevent a risk of radioactive exposure of the operating personnel through contact with the cooling water discharging from the sampling line at the discharge outlet.

SUMMARY OF THE INVENTION

An object of the present invention is to provide a method and an apparatus for detecting failure of nuclear fuel capable of carrying out the sample water receptacle setting in parallel with the cell water removal operation, where a time for detecting failure of nuclear fuel is shortened only by the time required for the sample water receptacle setting.

As will be described in detail later, about 400 to about 800 fuel assemblies are disposed in the reactor core of a boiling water type nuclear reactor, though depending upon the output of the nuclear reactor. Thus, if 4 or 16 fuel assemblies are inspected in one run at the same time, inspection runs will amount to 100–200 or 25–50, respectively. Number of the sample water receptacle setting for inspection is always 400–800 runs in total. Thus, if the operating time per run can be shortened, even though a little, it will give a great influence upon the total inspection time, and can give a great contribution to reduction in the radioactive exposure of the operating personnel taking part in the inspection.

The present method for detecting failure of nuclear fuel, which can attain the aforementioned object, comprises a series of operations: sipper capping, sampling line flushing, sampling pump flushing, isolation, soaking, sample water receptacle setting, cell water removal and sampling with such a feature that the sipper capping, isolation, soaking, cell water removal and sampling constitutes a critical path.

Another feature of the present invention is that the flushing water remaining in the sampling line after the flushing is discharged from a first discharge outlet of the sampling line, and then the cooling water sampled from the interior of fuel assemblies is supplied to a sample water receptacle at a second discharge outlet of the sampling line. Even if the cooling water sampled from the fuel assemblies is supplied to the sample water receptacle at the second discharge outlet after the discharging of the flushing water at the first discharge outlet is completed, the operating personnel has no risk of radioactive exposure because the operating personnel sets the sample water receptacle to the second discharge outlet through which no flushing water is discharged, and thus the operations are quite safe. Thus, the sample water receptacle setting can be carried out in a very short time, and the time required for detecting failure of nuclear fuel can be shortened.

A further feature of the present invention is that the flushing water existing in the sampling line after the flushing is discharged at a first discharge outlet, and the cooling water sampled is supplied to a sample water receptacle at a second discharge outlet immediately after the discharge of the flushing water at the first discharge outlet, and the sample water receptacle is set to the second discharge outlet before the discharging of the flushing water at the first discharge outlet is completed, whereby the time for detecting failure of nuclear fuel is considerably shortened.

DESCRIPTION OF THE PREFERRED EMBODIMENTS

Figure 1:
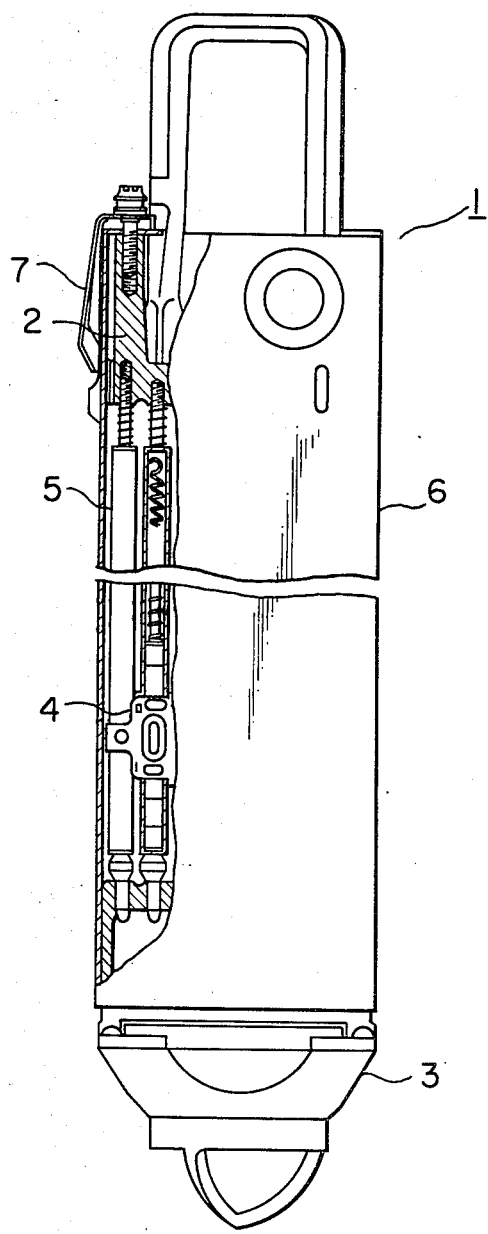
FIG. 1 shows the structure of a fuel assembly to be charged in a boiling water type nuclear reactor.

In FIG. 1 is shown a fuel assembly of a boiling water type nuclear reactor, where a fuel assembly 1 is comprised of a plurality of fuel rods 5 supported by an upper tie plate 2, a lower tie plate 3, and a spacer 5, a channel box encasing the fuel rods 5, and a channel fastener 7 comprised of an elastic member for fixing the channel box 6 to the upper tie plate 2 and maintaining a clearance between the fuel assembly 1 and other adjacent fuel assemblies when the fuel assembly 1 is charged in a reactor core.

Figure 6:
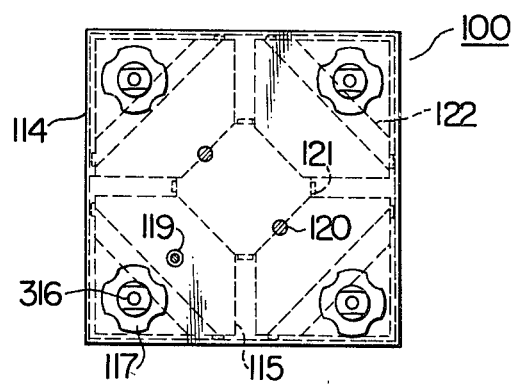
FIG. 6 is a cross-sectional view along VI—VI of FIG. 5.

In the reactor vessel of a boiling water type nuclear reactor, about 400 to about 800 fuel assemblies 1 are uniformly charged, as shown in FIG. 6 to constitute a reactor core part. Control rods 8 of cross type are arranged between the fuel assemblies.

Figure 2:
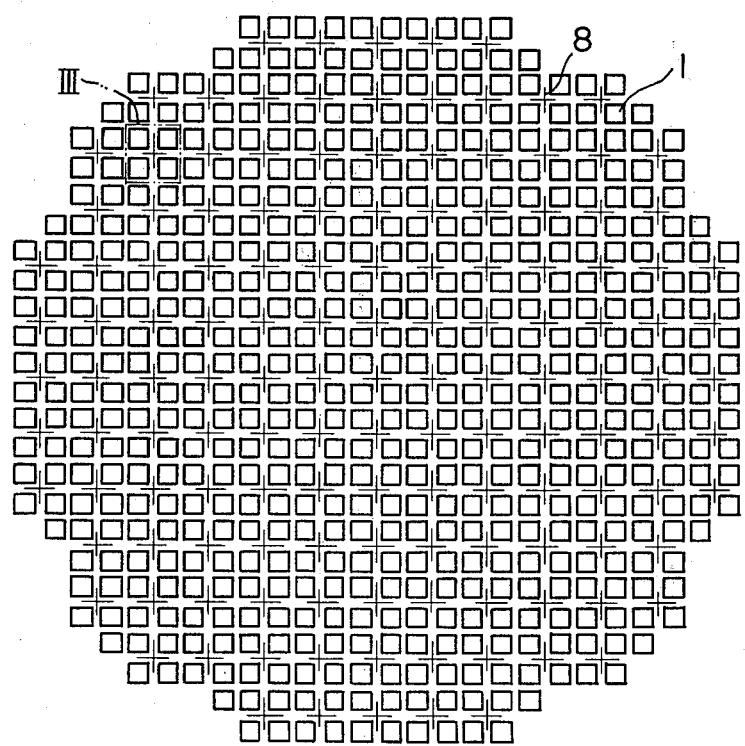
FIG. 2 shows a layout of fuel assemblies in the nuclear reactor.
Figure 3:
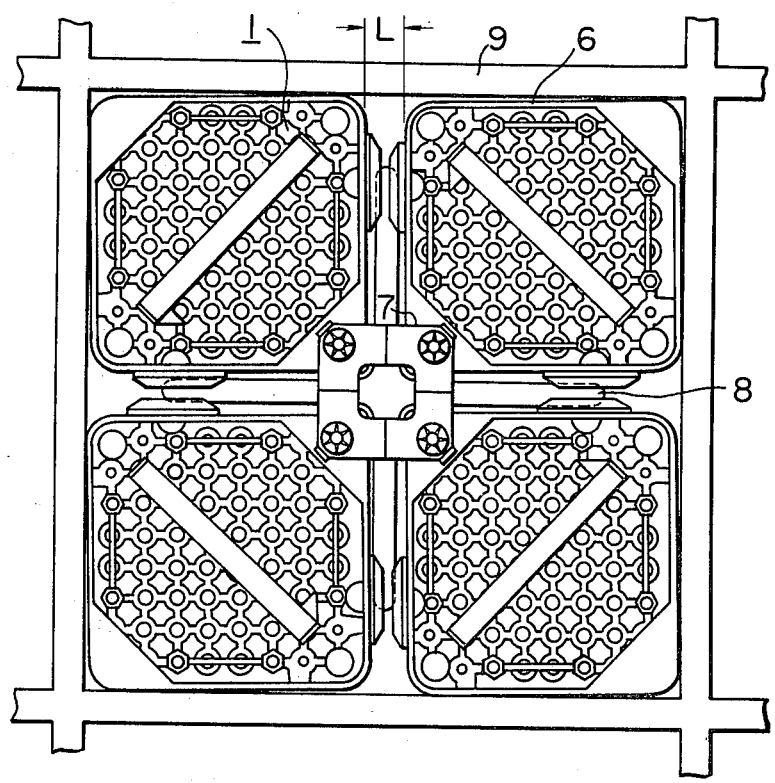
FIG. 3 is an enlarged view of Section III in FIG. 2.

FIG. 3 is an enlarged view of section III of FIG. 2, where a unit cell is comprised of four fuel assemblies 1 and a control rod 8 of cross type and is charged in a square frame unit of upper lattice plate 9 of a square frame type provided in the nuclear reactor vessel. The distance L between the adjacent fuel assemblies 1 in the unit cell is maintained by the channel fasteners 7 of the four fuel assemblies 1 and serves as a passage for the control rod 8.

Figure 4:
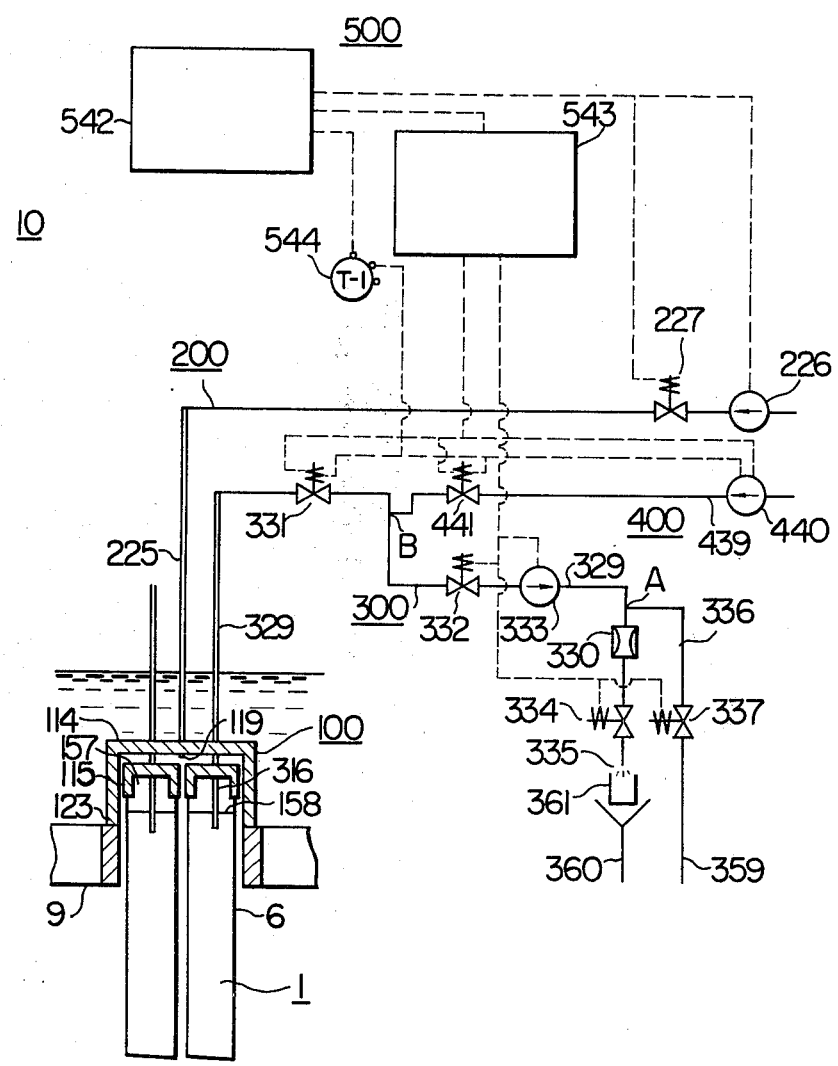
FIG. 4 is a flow diagram of an appartus for detecting failure of nuclear fuel according to one preferable embodiment of the present invention.

In FIG. 4, an apparatus for detecting failure of nuclear fuel is shown. The apparatus 10 for detecting failure of nuclear fuel comprises a sipper cap 100, an air supply unit 200, a sampling unit 300, a flushing water supply unit 400 and a controlling unit 500 for these units.

Figure 5:
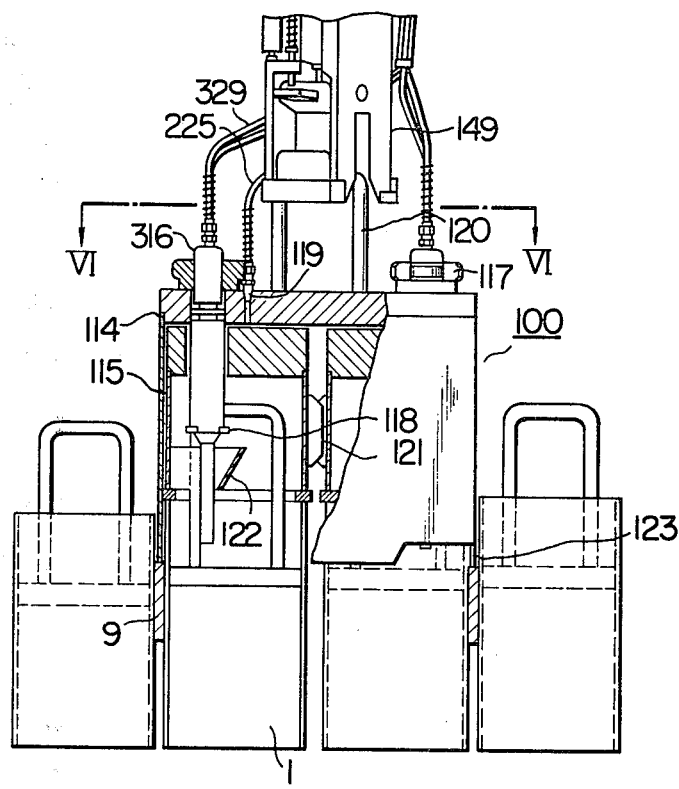
FIG. 5 is an enlarged view of the sipper cap and its surroundings shown in FIG. 4.

Detail of the sipper cap 100 is shown in FIGS. 5 and 6. The sipper cap 100 has an outer cap 114 and inner caps 115. That is, four inner caps 115 are arranged in one outer cap 114 of square cross-section. Water sampling conduits 316 is fixed to a water-sampling conduit fixture opening 117 provided on the top of the outer cap 114. Four water-sampling conduits 316 are provided, and each of the water-sampling conduits 316 is projected into each of the inner caps 115. A stopper 118 is provided at each of the water-sampling conduits 316 to prevent the inner caps 115 from falling. An air supply inlet 119 is provided through the upper wall of outer cap 114. Furthermore, a handle 120 is fixed to the top of the outer cap 114. Guide plates 121 and 122 are fixed to the side and the interior of inner caps 115. A recess is provided at the lower end of outer cap 114.

The air supply unit 200 includes an air supply conduit 225 connected to the air supply inlet 119 provided at the outer cap 114. A blower 226 and an electromagnetic valve 227 are provided in the air supply conduit 225.

The sampling unit 300 includes a sampling conduits 316 fixed to the outer cap 114. A sampling line 329 is connected to each of the sampling conduits 316. An electromagnetic valve 331, an electromagnetic valve 332, a sampling pump 333, a constant flow rating valve 330 and an electromagnetic valve 334 are provided in the sampling line 329 in this order from the upstream side. A discharge outlet 335 is provided at the tip end of the sampling line 329. A cell water discharge conduit 336 is connected to the sampling line 329 at point A between the sampling pump 333 and the constant flow rating valve 330. An electromagnetic valve 337 is provided in the cell water discharge conduit 336.

Flushing water supply conduit 439 of the flushing water supply unit 400 is connected to the sampling line at point B between the electromagnetic valve 331 and the electromagnetic valve 332. A pump 440 and an electromagnetic valve 441 are provided in the flushing water supply conduit 439.

Figure 7:
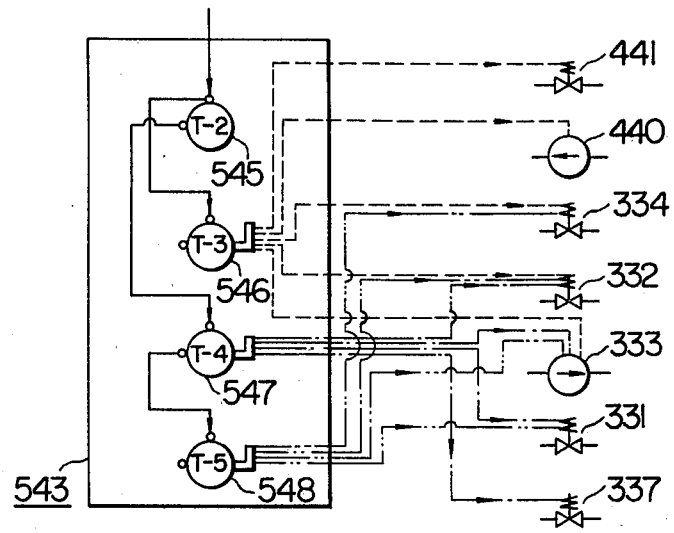
FIG. 7 shows detail of the controller shown in FIG. 4.

The controlling unit 500 comprises an operating panel 542, a controller 543 and a timer 544. The controller 543 includes timers 545, 546, 547 and 548 as shown in FIG. 7.

Operating procedure of the present invention will be described below:

After a boiling water-type nuclear reactor is shut-down, detection of failure of fuel assemblies 1 is carried out. After the shut-down, the top cover of the nuclear reactor vessel is removed, and cooling water is filled into the nuclear reactor well up to the topmost floor surface of the nuclear reactor housing.

Figure 8:
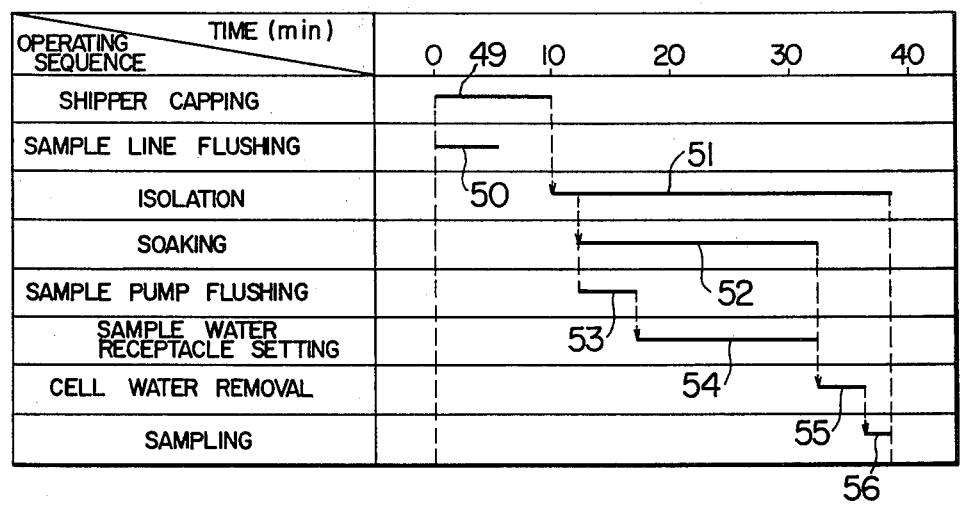
FIG. 8 is a chart showing operating steps of a method for detecting failure of nuclear fuel, which is applicable to the apparatus shown in FIG. 4.

Operational procedure for the apparatus 10 for detecting failure of nuclear fuel will be described, referring to FIG. 8.

At first, sipper capping operation 49 is carried out. A gripper 149 of an apparatus for exchanging fuel provided in the nuclear reactor housing grips the handle 120 of sipper cap 100, travels together with the gripped sipper cap 100 over to the position above fuel assemblies 1 to be detected, and allows the lower end of outer cap 114 to mount on the upper lattice plate 9. The lower ends of four inner caps 115 are brought in contact with the upper ends of the respective channel boxes 6 of four fuel assemblies.

In parallel with the sipper capping operation 49, a sampling line flushing operation 50 is carried out. By turning a predetermined switch of the operating panel 542 on, the timer 544 actuates to open the electromagnetic valves 331 and 441 and drive the pump 440. Fresh flushing water is supplied into the sampling line 329 at the upstream side from point B through the flushing water supply conduit 439 to flush the sampling line 329. The flushing water is discharged from the sampling conduit 316. When the timer 544 is turned off after the predetermined period of time, the electromagnetic valves 331 and 441 are closed, and driving of the pump 440 is stopped.

The sampling line flushing operation 50 is completed before the sipper cap 100 is mounted onto the upper lattice plate 9. If the flushing water is discharged from the sampling conduit 316 after the mounting of the sipper cap 100 onto the upper lattice plate 9, determination of the presence of failure of the fuel assemblies 1 to be newly detected will be influenced.

Aftr the completion of sipper capping operation 49, a switch of operating panel 542 is turned on to open the electromagnetic valve 227 and drive the blower 226. Air is introduced into the outer cap 114 through the air supply conduit 225. The air flows into the inner caps 115 through clearances between the inner caps 115 and sampling conduits 316. An air layer 157 is formed in the sipper cap 100 to press down the liquid level 158 in the sipper 100 (isolation operation 51). When air bubbles are discharged from the outer cap 114 at the recess 123 to the outside of the outer cap 114, lowering of the liquid level 158 is stopped. At that time, the liquid level 158 is located at a position below the upper end of channel boxes 6 of the respective fuel assemblies 1. By confirming the discharge of air bubbles at the recess, it can be also confirmed that the isolation operation is securely carried out. By lowering the liquid level 158 down to the level of the recess 123, flowing of cooling water passing through the interior of the channel boxes 6 in an axial direction is interrupted to isolate four fuel assemblies 1 from one another. The isolation operation is continued until the sampling operation 56 has been completed.

Upon confirmation of discharge of air bubbles at the recess 123 by lowering the liquid level 158 in the sipper cap 100, a switch of the operating panel 542 is turned on to actuate the timer 545 of controller 543. During the actuation of timer 545, the air layer 157 is continuously established in the interior of the sipper cap 100 (soaking operatin 52). Temperature of cooling water in the fuel assemblies 1 is elevated by the heat of decay of nuclear fuel during the period of soaking operation 52 in the same manner as in the conventional art, and if there is failure of fuel rod 5 in the fuel assemblies, a radioactive level of the cooling water is increased.

At the same time when the timer 545 is actuated, a timer 546 is also actuated to conduct sampling pump flushing 53. By the actuation of timer 546, the electromagnetic valves 332, 334 and 441 are opened to drive the sampling pumps 333 and 440. Flushing water is introduced into the sampling line 329 at the downstream side from point B through the flushing water supply conduit 439 to conduct flushing of the sampling line 329 at the downstream side from point B. Flushing water is discharged into a nuclear reactor well at the discharge outlet 355 through a drain receptacle 360. After the predetermined period of time, the timer 546 is turned off to close the electromagnetic valves 332, 334, and 441, stop driving of sampling pumps 333 and 440 and complete the sampling pump flushing operation 53.

After the timer 546 is turned off, a lamp of a sample water receptacle setting on the operating panel 542 is turned on. The lamp is on during the soaking operation 52 and off when the timer 545 is off. During the period that the lamp is on, operating personnel sets a sample water receptacle 361 under the discharge outlet 335 (sample water receptacle setting 54). After complete stoppage of discharging the flushing water at the discharge outlet 335, the sample water receptacle 361 is set under the discharge outlet 335. Since there is ample time for the sample water receptacle setting 54, the operating personnel can set the sample water receptacle 361 in a safe state without any risk of radioactive exposure. Four sample water receptacles 361 are set under discharge outlets 335 of the respective sampling units 300 inserted into the four fuel assemblies to be detected.

The sample water receptacle setting 54 can be carried out not only during the period of soaking operation 52, but also during the period of cell water removal operation 55 which will be described later. However, the sample water receptacle setting 54 must be completed before a sampling operation 56 is started. Since the soaking operation 52 (or cell water removal operation 55) can be carried out in parallel with the sample water receptacle setting 54, the time for detecting failure of nuclear fuel can be shortened.

When the timer 545 is turned off, the soaking operation 52 is completed. At the same time when the timer 545 is turned off, a timer 547 is actuated to open the electromagnetic valves 331, 332 and 337 and drive the sampling pump 333. The flushing water retained in the sampling line 329 is discharged into the nuclear reactor well at the discharge outlet 359 through the cell water discharge conduit 336 (cell water removal operation 55). By driving the pump 333, the cooling water in the fuel assemblies 1 is withdrawn by suction through the sampling conduit 316. When the timer 547 is turned off, the cooling water is full in the sampling line 329 and all of the flushing water is discharged. The discharged flushing water is not led to the set sample water receptacle 361. Unless all of the flushing water is discharged, fresh flushing water is led to the sample water receptacle 361 by the sampling operation 56 to influence the determination of the presence of failure of nuclear fuel.

The sampling line 329 at the downsteam side from point A is vertical, and thus the flushing water is not retained in the downstream side of the sampling line 361. That is, it is not necessary to conduct the cell water removal operation of the downstream side.

When the timer 547 is turned off, the cell water removal operation 55 is completed, and at the same time a timer 548 is actuated. By turning off the timer 547, the electromagnetic valve 337 is closed, whereas by the actuation of the timer 548, the electromagnetic valve 334 is newly opened. Other electromagnetic valves 331 and 332 than the electromagnetic valve actuated by the timer 547, and the sampling pump 333 are continuously actuated as they are during the period of actuation of the timer 548. The cooling water in the fuel assemblies 1 introduced into the sampling line 329 by suction is led to the sample water receptacle 361 at the discharge outlet 335. When the timer 548 is turned off, the electromagnetic valves 331, 332 and 334 are closed, and the driving of the sampling pump is stopped, whereby the sampling operation 56 is completed. The cell water removal operation 55 and the sampling operation 56 can be continuously carried out only by switching of the electromagnetic valves 334 and 337, and thus the time required for detecting failure of nuclear fuel can be shortened. In contrast to the conventional art, it is not necessary to conduct stopping and restarting operations of the sampling pump 333 between the cell water removal operation 55 and the sampling operation 56, and operations for detecting failure of nuclear fuel can be simplified. Furthermore, the constant flow rating valve 330 is provided, and a predetermined sampling time is set by the timer 548, and thus, a predetermined amount of cooling water can be led to the respective sample water receptacles 361. Thus, the presence of failure of fuel rods 5 can be determined with high precision. In view of the decay of radioactivity, it is necessary to start sampling of a plurality of samples at the same time and complete the sampling at the same time. The present embodiment can satisfy such requirements. Unless a predetermined amount of cooling water is sampled, it is necessary to measure the sampled amount at the measurement of radioactive level.

When the timer 548 is turned of, a display lamp on the operating panel 542 is turned on. Operating personnel stops the driving of blower 226 and closes the electromagnetic valve 227 upon the display of the lamp. The radioactive level of cooling water in the sample water receptacle 361 is then measured to determine the presence of failure of fuel rod 5 in the fuel assemblies 1. The analysis of radioactivity can be carried out in parallel with a series of the operations such as sipper capping operation 49, etc., and thus immediately after the sampling operation 56 has been completed, a series of operations starting with the sipper capping operation 49 is repeated for another unit cell of fuel assemblies. When failure of fuel rod 5 is found, the fuel assembly 1 containing the failure of fuel rod is taken out of the reactor core, and a new fuel assembly 1 is charged into the reactor core.

According to the present embodiment, the sample water receptacle setting can be carried out in parallel with the soaking operation 52 or cell water removal operation 55, and the cell water removal operation 55 and the sampling operation 56 can be continuously carried out. Thus, the time required for detecting failure of nuclear fuel can be remarkably shortened. Furthermore, operation of electromagnetic valves, pumps, etc. can be automatically carried out by means of the controller 543, and, thus, operations of detecting failure of nuclear fuel can be considerably simplified. Particularly, when a sipper capable of detecting failure of 16 fuel assemblies 1 at the same time, as disclosed in U.S. patent application Ser. No. 85951 filed Oct. 18. 1979; German Patent Application No. P2942055,01 filed Oct. 17, 1979, is used, 16 lines of sampling unit 300 are provided, and thus the operations can be much facilitated by means of the controller 543 according to the present embodiment.

Figure 9:
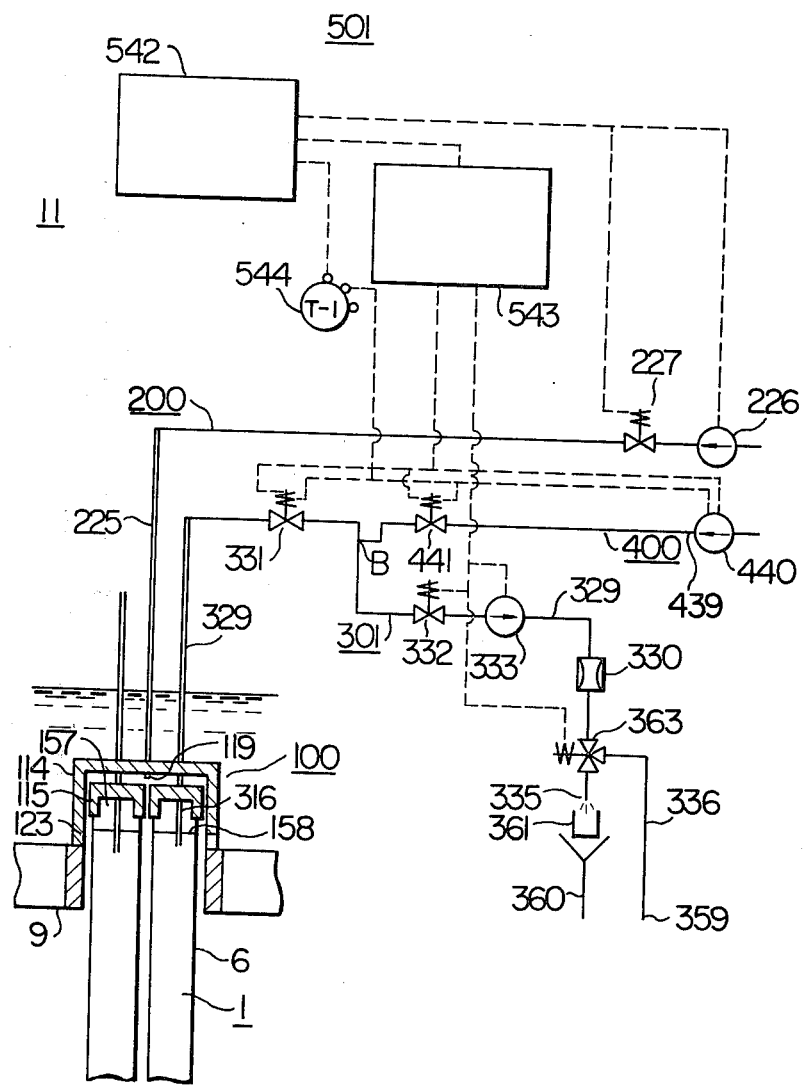
FIGS. 9 and 10 are flow diagrams according to other embodiments of the present invention.

Another embodiment of the present apparatus for detecting failure of nuclear fuel is shown in FIG. 9, where the same members as in the embodiment of FIG. 4 are indicated with the same reference numerals and symbols.

An apparatus 11 for detecting failure of nuclear fuel is provided with a three-way valve 363 at the downstream side of the constant flow rating valve 330 in the sampling line 329, and the cell water discharge conduit 336 is connected to the three-way valve 363. At the cell water removal operation 55, the three-way valve 363 is operated by the timer 547 to communicate the sampling line 329 with the cell water discharge conduit 336, and the flushing water in the sampling line 329 is discharged at the discharge outlet 359. During that operation, no flushing water is discharged at the discharging outlet 335. When the sampling operation 56 is started, the three-way valve 363 is operated by the timer 548 to communicate the upstream side of the sampling line 329 with the downstream side thereof. The cooling water in the fuel assemblies 1 is led to the sample water receptacle 361 at the discharge outlet 335.

According to the present embodiment, the same effects as in the preceding embodiment can be obtained. Furthermore, one electromagnetic valve can be omitted. Thus, the structure of an apparatus for detecting failure of nuclear fuel can be further simplified.

Figure 10:
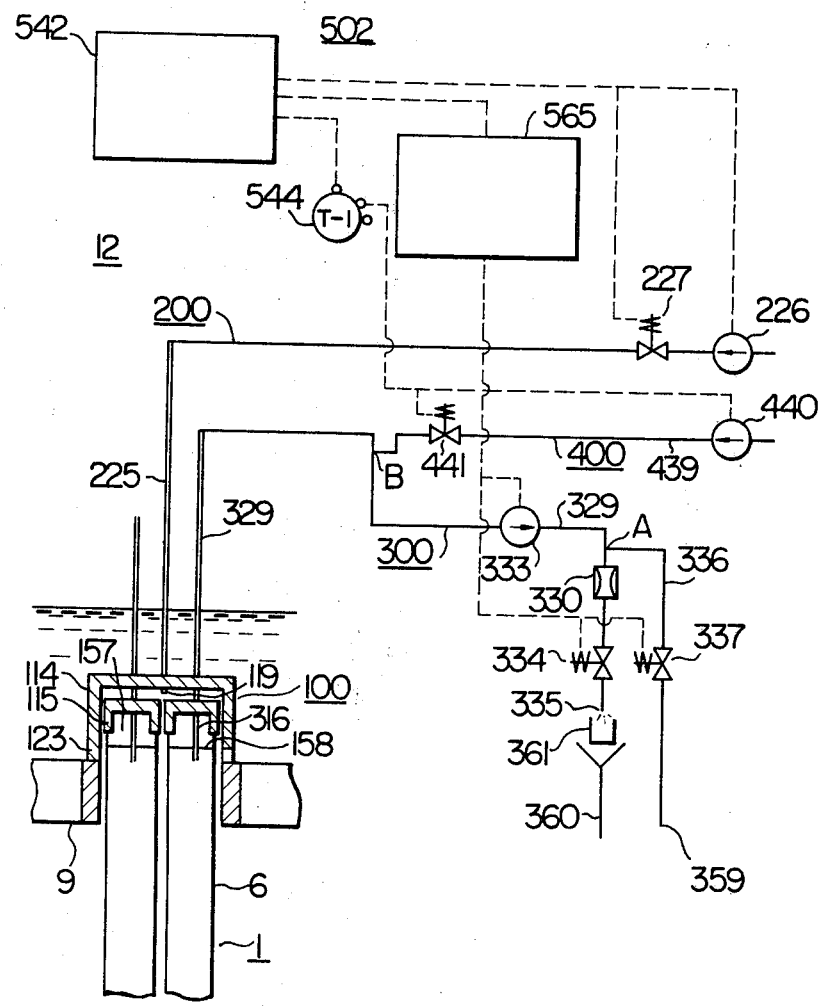
Figure 11:
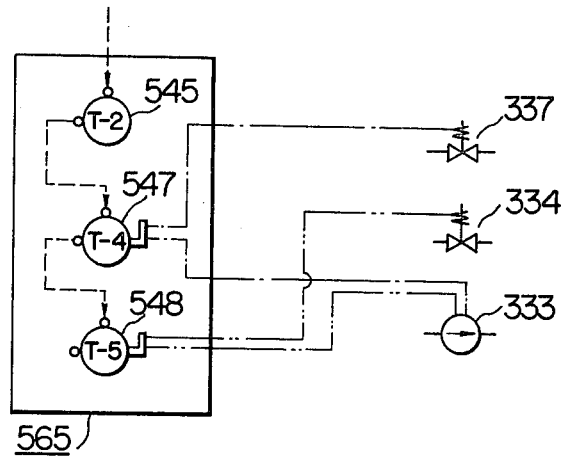
FIG. 11 shows detail of the controller shown in FIG. 10.

A further embodiment of the present apparatus for detecting failure of nuclear fuel is shown in FIG. 10. From an apparatus 12 for detecting failure of nuclear fuel are omitted the electromagnetic valves 331 and 332 of the apparatus for detecting failure of nuclear fuel, and a controller 565 comprises timers 545, 547 and 548 shown in FIG. 11. These are differences from the apparatus 10 for detecting failure of nuclear fuel. The same members as in the embodiment of FIG. 4 are indicated as the same reference numerals and symbols.

Figure 12:
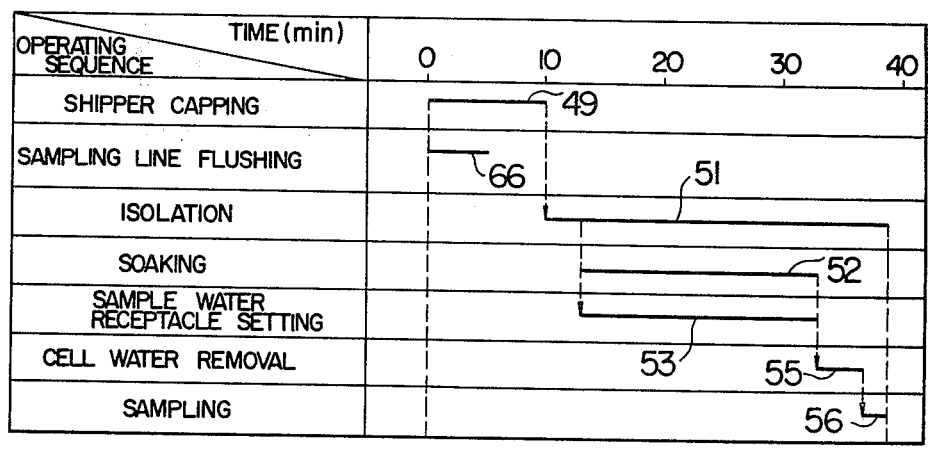
FIG. 12 is a chart showing operating steps of a method for detecting failure of nuclear fuel, which is applicable to the apparatus shown in FIG. 10.

The operating procedure for the further embodiment will be described below, referring to FIG. 12.

Sipper capping operation 49 is carried out in the same manner as in the preceding first embodiment. In parallel with the sipper capping operation 49, sampling line flushing operation 66 is carried out by turning a switch on the operating panel 542 on to actuate the timer 544, open the electromagnetic valve 441 and drive the pump 440. Flushing water supplied through the flushing water supply conduit 439 is divided into the upstream side and the downstream side of the sampling line 329 at point B and discharged from the sampling conduit 316 and from the discharge outlet 335 separately. The entire flushing kline 329 is flushed in this manner. After a predetermined period of time, the timer 544 is turned off to close the electromagnetic valve 441 and stop the driving of the pump 440. After the completion of the sipper capping operaion 49, the isolation operation 51 is carried out. When air bubbles are discharged at the recess 123 of the outer cap 114, the timer 545 of the controller 565 is actuated to start the soaking operation 52. In parallel with the soaking operation, the sample water receptacle setting 53 is carried out. The sample water receptacle 361 is set under the discharge outlet 335. When the timer 545 is turned off, the soaking operation 52 is completed. At the same time when the timer 545 is turned off, the timer 547 is actuated to open the electromagnetic valve 337 and drive the sampling pump 333 to carry out the cell water removal operation 55. When the cell water removal operation 55 is completed, the timer 547 is turned off to actuate the timer 548. Through the change of the actuating timers, the electromagnetic valve 337 is closed and the electromagnetic valve 334 is opened, while the sampling pump 333 is continuously driven. The cooling water in the fuel assemblies 1 is led to the sample water receptacle 361 at the discharge outlet 335 (sampling operation 56).

In the present embodiment, the same effects as in the embodiment of FIG. 4 can be obtained. Futhermore, the number of the electromagnetic valves is reduced, and also the structure of controller 565 is simplified. Thus, the entire apparatus can take a simpler structure, and operations can be made much easier. The three-way valve 363 of FIG. 9 can be also used in the present embodiment of FIG. 10.

We claim:

1. A method for detecting failure of nuclear fuel, which comprises a sipper capping operation of transferring a sipper cap of the apparatus for detecting failure of nuclear fuel to a position above fuel assemblies to be detected and mounting the shipper cap on a top part of the fuel assemblies; an isolation operation of supplying air into the shipper cap after the mounting of the shipper cap, thereby forming an air layer and isolating the fuel assemblies to be detected from other fuel assemblies; a soaking operation of keeping the fuel assemblies to be detected in the isolated state by the isolation operation for a predetermined period of time; a cell water removal operation of introducing cooling water in the fuel assemblies into a line after completion of the soaking operation and simultaneously removing cell water retained in the line; a sampling operation of introducing a predetermined amount of the cooling water in the fuel assemblies into a sample water receptacle, the cooling water being discharged successively after the removal of cell water; and an operation of detecting a radioactivity level value of sample water and detecting failure of nuclear fuel from a detected abnormal value, said operations being performed successively in series.

2. A method for detecting failure of nuclear fule, which comprises a first step of projecting sampling conduits into fuel assemblies charged in a reactor core, a second step of stopping flow of cooling water passing through the fuel assemblies, a third step of keeping the fuel assemblies in a state of the flow of the cooling water being stopped for a predetermined period of time, a fourth step of supplying flushing water into the sampling conduits, thereby flushing the inside of the sampling conduits, a fifth step of discharging the flushing water existing in the sampling conduits therefrom at first discharge outlets after the fourth step, and a sixth step of supplying the cooling water in the fuel assemblies to sample water receptacles from the sampling conduits at second discharge outlets after the fifth step.

3. A method for detecting failure of nuclear fuel, which comprises a first step of projecting sampling conduits into fuel assemblies charged in a reactor core, a second step of stopping flow of cooling water passing through the fuel assemblies, a third step of keeping the fuel assemblies in a state of the flow of the cooling water being stopped for a predetermined period of time, a fourth step of supplying flushing water into the sampling conduits, thereby flushing the inside of the sampling conduits, a fifth step of discharging the flushing water existing in the sampling conduits therefrom at first discharge outlets after the fourth step, a sixth step of supplying the cooling water in the fuel assemblies into sample water receptacles from the sampling conduits at second discharge outlets, and a seventh step of setting the sample water receptacle to the second discharge outlets,, the third, fifth and sixth steps being continuously carried out in this order, and the seventh step being carried out after completion of the fourth step and before starting of the sixth step.

4. An apparatus for detecting failure of nuclear fuel, which comprises a means of stopping flow of cooling water passing through fuel assemblies charged in a reactor core, sampling conduits having first discharge outlets for discharging flushing water remaining in the inside of the sampling conduits after flushing and second discharge outlets for discharging sampled cooling water, a means of supplying the flushing water to the sampling conduits, and a means of switching an operation of discharging the flushing water at the first discharge outlets and an operation of discharging the sampled cooling water at the second discharge outlets.

5. Apparatus according to claim 4, wherein the means of stopping flow of cooling water through the fuel assemblies comprises a cap covering the top part of the fuel assemblies and a means of supplying a gas into the cap.

6. An apparatus according to claim 4, wherein a constant flow rating valve is provided in the sampling conduits of supplying the sampled cooling water to the second discharge outlets.

7. An apparatus according to claim 4, wherein the means of switching the discharging operations comprises a plurality of timers.

8. An apparatus for detecting failure of nuclear fuel, which comprise a a means of stopping flow of cooling water passing through fuel assemblies charged in a reactor core, sampling conduits having first discharge outlets for discharging flushing water remaining in the inside of the sampling conduits after flushing and second discharge outlets for discharging the sampled cooling water, a means of supplying the flushing water into the sampling conduits, a means of switching a first operation of discharging the flushing water from the first discharge outlets and a second operation of discharging the sampled cooling water at the second discharge outlets, and a means of controlling the means of switching, thereby stating the second operation of discharging at the same time as completion of the first operation of discharging.

9. An apparatus according to claim 8, wherein the means of stopping flow of the cooling water passing through the fuel assemblies comprises a cap covering the top part of the fuel assemblies and a means of supplying a gas into the cap.

10. An apparatus according to claim 8, wherein a constant flow rating valve is provided in the sampling conduits of supplying the sampled cooling water to the second discharge outlets.

11. An apparatus according to claim 8, wherein the means of switching the discharging operations comprises a plurality of timers.

12. A method according to claim 1, further comprising the operation of setting the sample water receptacle for receiving the sample water prior to completion of the removal of cell water retained in the line.

13. A method for detecting failure of nuclear fuel according to claim 2, further comprising a seventh step of setting the sample water receptable to the second discharge outlets prior to completion of the fifth step.

14. A method for detecting failure of nuclear fuel according to claim 13, wherein the sixth step is carried out immediately upon completion of the fifth step.

* * * * *